United States Patent
Huang et al.

(10) Patent No.: US 8,345,102 B2
(45) Date of Patent: Jan. 1, 2013

(54) IMAGE PROCESSING SYSTEM AND METHOD FOR OBJECT TRACKING

(75) Inventors: Yu Huang, Plainsboro, NJ (US); Hongbing Li, Belle Mead, NJ (US); Jun Tian, Plainsboro, NJ (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 248 days.

(21) Appl. No.: 12/686,889

(22) Filed: Jan. 13, 2010

(65) Prior Publication Data

US 2010/0177194 A1 Jul. 15, 2010

Related U.S. Application Data

(60) Provisional application No. 61/144,393, filed on Jan. 13, 2009.

(51) Int. Cl.
*H04N 7/18* (2006.01)
(52) U.S. Cl. ........................................................ 348/157
(58) Field of Classification Search .................... 348/157
See application file for complete search history.

(56) References Cited

U.S. PATENT DOCUMENTS

| | | | |
|---|---|---|---|
| 5,638,465 A | | 6/1997 | Sano et al. |
| 5,961,571 A | * | 10/1999 | Gorr et al. ...................... 701/494 |
| 6,363,160 B1 | * | 3/2002 | Bradski et al. ................. 382/103 |
| 6,587,593 B1 | | 7/2003 | Matsuoka et al. |
| 7,251,364 B2 | | 7/2007 | Tomita, Jr. et al. |
| 2003/0107649 A1 | * | 6/2003 | Flickner et al. ................ 348/150 |
| 2006/0280335 A1 | | 12/2006 | Tomita, Jr. et al. |
| 2006/0291696 A1 | * | 12/2006 | Shao et al. ...................... 382/103 |
| 2007/0250901 A1 | | 10/2007 | McIntire et al. |
| 2008/0101652 A1 | | 5/2008 | Zhao et al. |
| 2008/0298571 A1 | | 12/2008 | Kurtz et al. |
| 2009/0034932 A1 | | 2/2009 | Oisel et al. |
| 2009/0238406 A1 | | 9/2009 | Huang et al. |
| 2010/0177969 A1 | | 7/2010 | Huang et al. |

FOREIGN PATENT DOCUMENTS

| | | |
|---|---|---|
| CN | 101098465 | 1/2008 |
| CN | 101159859 | 4/2008 |
| CN | 101212658 | 7/2008 |

OTHER PUBLICATIONS

Notification of Transmittal of the International Search Report and the Written Opinion of the International Searching Authority, or the Declaration, International Application No. PCT/US10/20922, dated Mar. 1, 2010, 8 pages.

(Continued)

*Primary Examiner* — Joseph Avellino
*Assistant Examiner* — Marshall McLeod
(74) *Attorney, Agent, or Firm* — Slater & Matsil, L.L.P.

(57) ABSTRACT

An image processing method can be performed on a video image that includes an initial frame and a plurality of subsequent frames. An object is located within the initial frame of the video image and a histogram related to the object is generated. A foreground map that includes the object is also generated. For each subsequent frame, a mean shift iteration is performed to adjust the location of the object within the current frame. The histogram related to the object and the foreground map can then be updated.

34 Claims, 5 Drawing Sheets

OTHER PUBLICATIONS

Avidan, S., "Ensemble Tracking," Mitsubishi Electric Laboratories, TR2005-065, CVPR, Jun. 2005, 9 pages.

Babu, R. V., et al., "Robust Tracking with Motion Estimation and Kernel-Based Color Modelling," IEEE, ICIP'05, 2005, 4 pages.

Balfanz, D., et al., "Interaction with Content-Augmented Video Via Off-Screen Hyperlinks for Direct Information Retrieval," The 10-th Int. Conf. in Central Europe on Computer Graphics, Visualization and Computer Vision, Czech Republic, Feb. 4-8, 2002, 8 pages.

Barnard, M., et al., "Robust Playfield Segmentation using MAP Adaptation," ICPR'04, 2004, 4 pages.

Beetz, M., et al., "Camera-based Observation of Football Games for Analyzing Multi-agent Activities," Proc. of Int. Joint Conf. on Autonomous Agents and Multiagent Systems, Japan, 2006, 8 pages.

Black, M. J., et al., "EigenTracking: Robust Matching and Tracking of Articulated Objects Using a View-Based Representation," EECV'96, 1996, 14 pages.

Bradski, G. R., "Computer Vision Face Tracking for Use in a Perceptual User Interface," IEEE Workshop on Applications of Computer Vision, 1998, 15 pages.

Choi, S., et al., "Where are the ball and players?: Soccer Game Analysis with Color-based Tracking and Image Mosaick," Int. Conf. on Image Analysis and Processing, Sep. 1997, 15 pages.

Collins, R., "Mean-Shift Blob Tracking through Scale Space," CVPR'03, 2003, 7 pages.

Collins, R. T., et al., "On-Line Selection of Discriminative Tracking Features," CVPR'03, 2003, 14 pages.

Comaniciu, D., et al., "Kernel-Based Object Tracking," IEEE T-PAMI, vol. 25, Issue 5, May 2003, 30 pages.

Hager, G. D., et al., "Multiple Kernel Tracking with SSD," CVPR'04, 2004, 8 pages.

Huang, Y., et al., "A Method of Small Object Detection and Tracking Based on Particle Filters," ICPR'08, 2008, Florida, Dec. 2008, 4 pages.

Huang, Y, et al., "Players and Ball Detection in Soccer Videos Based on Color Segmentation and Shape Analysis," Int. Workshop on Multimedia Content Analysis and Mining (MCAM'07), Jun. 2007, 10 pages.

Jepson, A. D., et al., "Robust Online Appearance Models for Visual Tracking," IEEE Conference on Computer Vision and Pattern Recognition, Kauai, 2001, vol. 1, pp. 415-422.

Kaneko, T., et al., "Template Update Criterion for Template Matching of Image Sequences," ICPR'02, IEEE, 2002, 5 pages.

Lim, J., et al., "Incremental Learning for Visual Tracking," MIT Press, 2005, 8 pages.

Liu, J., et al., "Automatic Player Detection, Labeling and Tracking in Broadcast Soccer Video," European Conference on Computer Vision, 2007, 10 pages.

Matthews, I., et al., "The Template Update Problem," The Robotics Institute, Carnegie Mellon University, IEEE T-PAMI, 26(6), 2004, 16 pages.

Nguyen, H. T., et al., "Fast Occluded Object Tracking by a Robust Appearance Filter," IEEE Transactions on Pattern Analysis and Machine Intelligence, vol. 26, No. 8, Aug. 2004, 6 pages.

Porikli, F., et al., "Object Tracking in Low-Frame-Rate Video," SPIE Image and Video Communications and Processing, vol. 5685, Mar. 2005, 10 pages.

Rittscher, J., et al., "A Probabilistic Background Model for Tracking," ECCV'00, 2000, 15 pages.

Spagnolo, P., et al., "Unsupervised Algorithms for Segmentation and Clustering Applied to Soccer Players Classification," Int. Conf. on Signal Processing and Multimedia Applications, Barcelona, Jul. 2007, pp. 129-134.

Tong, X-F., et al., "An Effective and Fast Soccer Ball Detection and Tracking Method," Proceedings of the 17th International Conference on Pattern Recognition (ICPR'04), 4 pages.

Utsumi, O., et al., "An Object Detection Method for Describing Soccer Games from Video," IEEE ICME'02, 2002, 4 pages.

Xu, M., et al., "Tracking Football Players with Multiple Cameras," ICIP 2004, 4 pages.

Yilmaz, A., "Object Tracking by Asymmetric Kernel Mean Shift with Automatic Scale and Orientation Selection," CVPR'07, IEEE, 2007, 6 pages.

Yin, Z., et al., "Spatial Divide and Conquer with Motion Cues for Tracking through Clutter," IEEE CVPR'06, Jun. 2006, 8 pages.

Yu, X., et al., "Trajectory-Based Ball Detection and Tracking with Applications to Semantic Analysis of Broadcast Soccer Video," ACM Multimedia, 2003, pp. 11-20.

Zhang, H., et al., "Affine Object Tracking with Kernel-based Spatial-Color Representation," CVPR'05, 2005, 8 pages.

Zivkovic, Z., et al., "An EM-like algorithm for color-histogram-based object tracking," CVPR'04, 2004, pp. 798-803.

Rees, D., et al., "CLICK-IT: Interactive Television Highlighter for Sports Action Replay," Fourteenth International Conference on Pattern Recognition, 1998, 4 pages.

Huang, Y., "Player Highlighting and Team Classification in Broadcast Soccer Videos for the Next Generation TV," WOCC'09, 2009, 27 pages.

Vandenbroucke, N., et al., "Color image segmentation by pixel classification in an adapted hybrid color space. Application to soccer image analysis," Computer Vision and Image Understanding, vol. 90, No. 2, 27 pages, 2003.

Muselet, D., et al., "Color person image indexing and retrieval," Machine Graphics and Vision, vol. 11, No. 2/3, 21 pages, 2002.

Rakototmalala, V., et al., "Indentification of retinal vessels by color image analysis," Machine Grahics and Vision, vol. 7, No. 4, 23 pages, 1998.

Ultré, V., et al., "Determination of compatibility coefficients for color edge detection by relaxation," Proc. of the IEEE Int. Conf. on Image Processing (ICIP 96), vol. 3—Lausanne (Suisse), 5 pages, 1996.

Gillet, A., et al., "Color image segmentation by analysis of 3D histogram with fuzzy morphological filters," Chapter in the book: "Fuzzy filters for image procesing—Studies in fuzziness and soft computing," Springer-Verlag Editor, 25 pages, 2002.

Chinese Office Action and Partial Translation of Chinese Application No. 20108003873.8; mailed Oct. 8, 2012; 12 pages.

International Search Report for Chinese Application No. 20108003873.8; mailed Sep. 10, 2012; 2 pages.

\* cited by examiner

IMAGE PROCESSING SYSTEM AND METHOD FOR OBJECT TRACKING

This application claims the benefit of U.S. Provisional Application No. 61/144,393, filed on Jan. 13, 2009, entitled "Mean Shift-Based Object Tracking with Scale Adaptation and Target Model Updating," which application is hereby incorporated herein by reference.

TECHNICAL FIELD

Embodiments of the invention relate image processing and, in particular examples, to mean shift-based visual tracking in target representation and localization.

BACKGROUND

Systems and methods have been developed for defining an object in video and for tracking that object through the frames of the video. In various applications, a person may be the "object" to be tracked. For example, sports images and applications using surveillance cameras are interested in following the actions of a person.

Previously related work mostly applies the background information to realize a discrimination measure. For example, some related work searches for the best scale in the scale space by Difference of Gaussian filters or level set functions that are time consuming. A simple method looks for the scale by searching based on the same metric in location estimation which results in the shrinkage problem. Some other related work uses multiple kernels to model the relationship between the target appearance and its motion characteristics that yields complex and noise-sensitive algorithms. Some related work addresses template update only and uses the Kalman filtering or adaptive alpha-blending to update the histogram, but still results in accumulation errors.

SUMMARY OF THE INVENTION

In a first embodiment, an image processing method is performed on a video image that includes an initial frame and a plurality of subsequent frames. An object is located within the initial frame of the video image and a histogram related to the object is generated. A foreground map that includes the object is also generated. For each subsequent frame, a mean shift iteration is performed to adjust the location of the object within the current frame. The histogram related to the object and the foreground map can then be updated.

In certain embodiments, the mean shift iteration includes performing first, second and third searches for the object within the current frame. The first search is performed with an original scale of the object, the second search is performed with an enlarged scale of the object, and the third search is performed with a shrunken scale of the object. The best match of the three searches can then be selected.

Other embodiments and features are described herein.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments of the present invention contribute up to three features for color histogram-based visual object tracking: 1) adoption of a mean shift-based object tracking method with soft constraints of the foreground map, which can be generated from either motion segmentation, background modeling and subtraction, or the field model; 2) update of the target histogram in a conservative way by aligning it with the initial target model; and/or 3) scale adaption where the optimal scale in histogram matching should make the tracked target most discriminative from its surrounding background.

In various embodiments, the present invention provides methods for overcoming shortcomings of the mean shift-based method in tracking the fast moving object. The methods include adding soft constraints of the foreground map from segmentation into the mean shift-based tracking framework which alleviates the shortcoming in handling the fast moving object. The methods also include adapting the scale in histogram-based visual tracking by a proposed discriminant function which takes into account of discrimination of the target from its surrounding background to avoid the "shrinkage" problem in scale determination. The method also includes updating the color histogram-based appearance model in visual tracking to cope with the drifting artifacts in a conservative way, where the drifting errors are further reduced.

Numerous benefits are achieved using aspects of the present invention over conventional techniques. Several embodiments, which can be utilized individually or in various combinations, are provided. For example, a foreground map is introduced into the mean shift iteration, modifying the distribution and mean shift vector only. A feature of searching the scale in tracking is based on discrimination of the tracked target from its background. A feature aligns the color histogram of the target model with the initial target model.

Embodiments of the invention may be potentially applied in interactive television (iTV), internet protocol television (IPTV), surveillance, smart room, and event analysis, as just some examples. Embodiments of the invention may provide value added services for IPTV, interactive TV, interactive video, personalized IPTV, social TV, and tactics analysis in sports video data.

In hyperlinked video, objects are selectable resulting in an associated action, akin to linked rich media content about the objects of interest. Possible venues for hyperlinked video include broadcast TV, streaming video and published media such as DVD. Hyperlinked video offers interaction possibilities with streaming media.

Interactive TV is a popular application area of hyperlinked video with the convergence between broadcast and network communications. For example, the European GMF4iTV (Generic Media Framework for Interactive Television) project has developed such a system where active video objects are associated to metadata information, embedded in the program stream at production time and can be selected by the user at run time to trigger the presentation of their associated metadata. Another European PorTiVity (Portable Interactivity) project is developing and experimenting with a complete end-to-end platform providing Rich Media Interactive TV services for portable and mobile devices, realizing direct interactivity with moving objects on handheld receivers connected to DVB-H (broadcast channel) and UMTS (unicast channel).

IPTV (Internet Protocol Television) is a system where a digital television service is delivered using Internet Protocol over a network infrastructure, which may include delivery by a broadband connection. An IP-based platform also allows significant opportunities to make the TV viewing experience more interactive and personalized. Interactive TV services will be a key differentiator for the multitude of IPTV offerings that are emerging. Interactivity via a fast two-way connection will lift IPTV ahead of today's television.

Localization of objects of interest is of interest for interactive services in IPTV systems, so that a regular TV broadcast (MPEG-2/-4) is augmented with additional information (MPEG-7 encoded) that defines those objects in the video, along with additional content to be displayed when they are selected. Specification of objects with additional content (metadata) is usually implemented by an authoring tool, which includes such functions as extraction of shots and key frames, specification of the interactive regions, and tracking of the specified regions to get the region locations in all frames. Therefore, an object tracking module is used in the authoring tool for the realization of interactive services in IPTV. Actually, visual object tracking is also important for other kinds of applications, such as visual surveillance, smart rooms, video compression and vision-based interfaces, etc.

Two major components can be distinguished in a typical visual object tracker. Target Representation and Localization is mostly a bottom-up process that also has to cope with the changes in the appearance of the target. Filtering and Data Association is mostly a top-down process dealing with the dynamics of the tracked object, learning of scene priors, and evaluation of different hypotheses. The most abstract formulation of the filtering and data association process is through the state space approach for modeling discrete-time dynamic systems, such as Kalman filter and Particle filter. Algorithms for target representation and localization are specific to images and related to registration methods. Both target localization and registration maximizes a likelihood type function. Mean shift-based visual tracking approaches fall into the target representation and localization as a gradient-based searching process for histogram matching. However, an apparent drawback of mean shift-based tracking methods is their strong requirement of significant overlap on the target kernels in consequent frames. Background/foreground information would help overcome this shortcoming by adding constraints into the mean shift iteration.

Various approaches, such as appearance-based approaches, template matching approaches, histogram matching approaches, are used. For example, appearance-based approaches for visual tracking vary from approaches that strictly preserve region structure-templates, to approaches that totally ignore the region structure and track based on feature distributions—histogram. In order to take into account the variations of the visual appearances, the appearance-based visual tracking method needs to update the target model in one way or another. Otherwise the drifting artifacts will happen, eventually resulting in the loss of the target. Drifting artifacts are caused by the accumulation of small errors in the appearance model, introduced each time the appearance is updated. Frequent appearance updates are required to keep the target model up-to-date with the changing target appearance; on the other hand, hasty updates of the appearance model will damage its integrity in face of drift errors. Therefore, appearance updates should be carefully designed.

Moreover, template matching approaches require pixel-wise alignment between the target template and the target candidate region and perform well for tracking rigid bodies and have been generalized to track deformable objects if the deformation models are known. Scale adaption in template matching-based tracking is easier to do since the target motion can be modeled clearly.

Furthermore, histogram matching approaches have great flexibility to track deformable objects as being robust to partial occlusion, but can lose the tracked region to another region with similar feature distribution, because the histogram matching approaches are less discriminative to appearance changes and less sensitive to certain motions. Histogram matching-based tracking handles the scale change with more difficulty since the structure information has been deemphasized.

Figure 1:
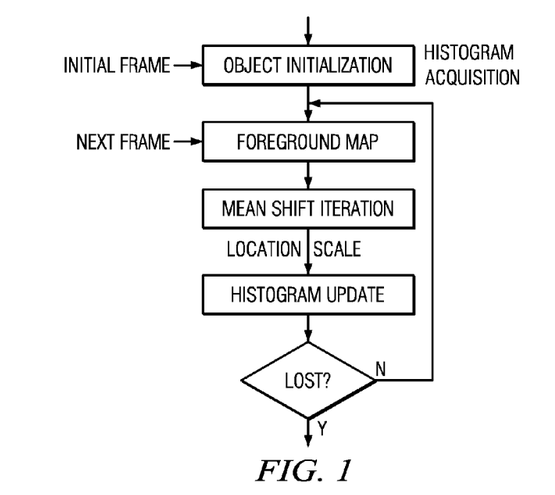
FIG. 1 shows the proposed tracking framework according to embodiments of the present invention.

FIG. 1 shows a proposed tracking framework according to embodiments of the present invention. Below details of each module will be provided.

Figure 2:
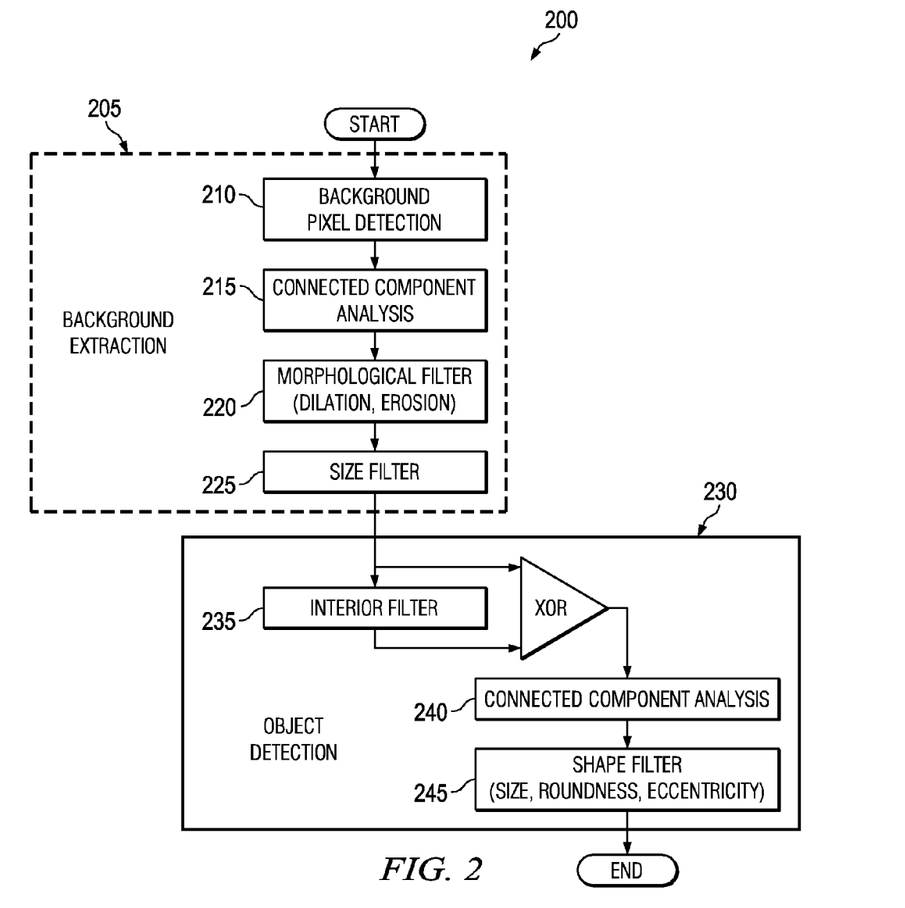
FIG. 2 shows a flow diagram for playfield model-based player/referee localization, according to embodiments of the present invention.

Referring to FIG. 1, the first step is object initialization. In one embodiment, the initial identification of the object can be performed manually. For example, a person viewing the video can select the object by drawing a box around the object. The object can also be located by executing an object location algorithm. One such algorithm is shown in FIG. 2. Then, the object can be selected by clicking on the frame provided with the object segmentation/detection result, i.e. if the clicking position in the image is close enough to the object blob.

FIG. 2 shows a typical framework for object localization. As illustrated in diagram 200, the framework can be divided into two portions, background extraction 205 and object detection 230.

The background extraction 205 includes background pixel detection 210, connected component analysis 215, morphological filtering (e.g., dilation, erosion) 220 and size filtering 225.

In some applications, such as sports videos, there are many shots where the majority of the image is the background or playfield. Based on this observation, an unsupervised segmentation technique can obtain the background model. However, the background area in any frame is not always big enough to make the assumption of dominant color valid. Therefore, supervised methods for learning the playfield model can be used. A drawback of the supervised methods is the requirement of many labeled data, where hand-labeling is tedious and expensive.

In one embodiment, two options are defined. The first option is a small set of labeled data, i.e., the pixels in a given background area, is used to generate a rough background model with a single Gaussian or a mixture of Gaussian distributions (for the latter one, more labeled data is compulsory). Then, this model can be modified by collecting more background pixels based on an unsupervised method using dominant color detection.

In a second option, one frame, where the dominant color assumption is satisfied, is selected. Then its dominant mode is extracted to generate the initial background model. Like the first option, this model can be modified by collecting more playfield pixels based on dominant color detection.

The determination of the background model is discussed in greater detail in commonly-owned and invented provisional patent application Ser. No. 61/144,386 (HW 09FW005P) and non-provisional patent application Ser. No. 12/686,902 (HW 09FW010), which applications are incorporated herein by reference. Further information can be derived from these applications in their entirety. Further aspects and embodiments of these co-pending applications can also be used in conjunction with the aspects and embodiments disclosed herein.

The framework in FIG. 2 can be applied for extraction or detection of objects from the background. The object detection 230 includes interior filtering 235. A comparison is made between the pre-filtered and the filtered image data as illustrated by the XOR gate. The result can be thought of as the image without the background. This result can then go through connected component analysis 240 and shape filtering 245. The shape filtering can deal with size, roundness and/or eccentricity, as examples.

Returning to FIG. 1, when the next frame is received, the foreground map can be generated. Various techniques can be used to generate a foreground map. Here, for example, a playfield model-based segmentation method is described to generate the foreground map. In a sports video, the background can be thought of as a playfield.

The playfield is shown visually in several types of sports videos, such as soccer, football, basketball, baseball and tennis For example, the playfield is grass in soccer, baseball and football videos. Given a playfield (grass) model learned from labeled data (it can be updated on-line if possible), for each pixel in a frame of the sports video, probability of being a playfield or non-playfield can be estimated. The playfield model can be represented by single Gaussian, mixture of Gaussian or color histogram ratio (playfield and non-playfield).

For example, assume the playfield model in the RGB color space to be a single Gaussian distribution as $$p_i(x)=N(x;\mu_i,\sigma_i), i=R,G,B \quad (1)$$

where N denotes the pdf value at x of a Gaussian with mean $\mu_i$ and covariance $\sigma_i$. Thus, the possibility of a pixel y with RGB value [r,g,b] in the frame is $$F(y)=p(\text{playfield}/[r,g,b])=N(r;\mu_R,\sigma_R)\cdot N(g;\mu_G,\sigma_G)\cdot N(b;\mu_B,\sigma_B). \quad (2)$$

A binary classification for the pixel y to be playfield or non-playfield can yield a weight mask as $$G(y) = \begin{cases} 1, & \text{if } |r-\mu_R|<t\sigma_R \text{ AND } |g-\mu_G|<t\sigma_G \\ & \text{AND } |b-\mu_B|<t\sigma_B \\ T, & \text{otherwise,} \end{cases} \quad (3)$$

where T is the weight for the foreground (T>1) and t is scaling factor (1.0<t<3.0).

Correspondingly, the possibility of a pixel to be foreground in the frame is given by 1.0−F(y).

In the tracking initialization, the target model (normalized color histogram) $q_t$ can be obtained as $$q_{t,u}=C_q\Sigma_{i=1}^{n_k}(1-F(x_i^*))k(\|x_i^*\|^2)\delta[b(x_i^*)-u], u=1, 2\ldots m, \quad (4)$$

where m is the number of bins in histogram (in a preferred embodiment, a 8×8×8 bins in RGB color space), δ is the Kronecker delta function, k(x) is the kernel profile function, $\{x_i^*\}_{i=1\sim n_k}$ are the normalized pixel locations in the target region, $b(x_i^*)$ associates the pixel locations $x_i^*$ to the discretized distribution bin and the normalization constant $C_q$ is expressed as $$C_q=1/(\Sigma_{i=1}^{n_k}k(\|x_i^*\|^2)\Sigma_{u=1}^m(1-F(x_i^*))\delta[b(x_i^*)-u]). \quad (5)$$

$q_0$ is defined as the normalized color histogram of the initial target model that is obtained at the first frame in tracking It will be used later for target model updating.

Figure 3:
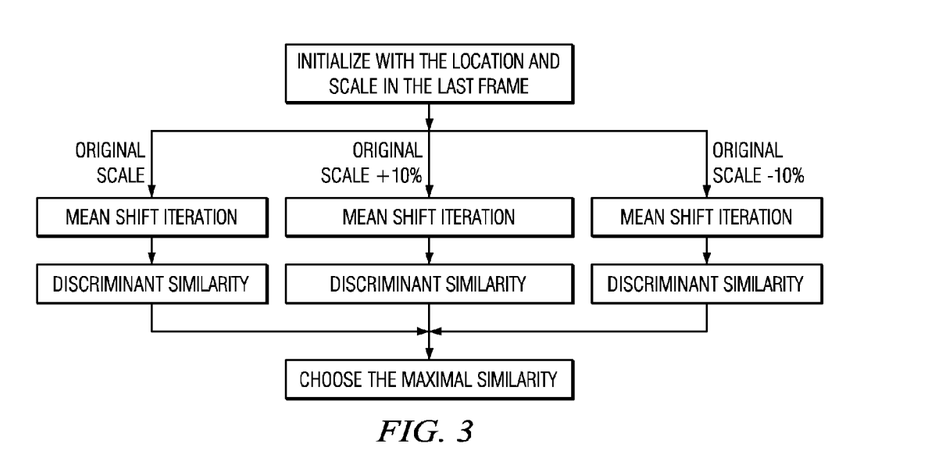
FIG. 3 shows a flow chart for mean shift iteration for scale and location estimation according to an embodiment of the present invention.

The next step in FIG. 1 shows mean shift iteration for location and scale estimation in tracking The mean shift iteration is to estimate the location and scale of the tracked object based on histogram matching. FIG. 3 shows mean shift iteration for scale and location estimation according to an embodiment of the present invention.

In this example, the mean shift iteration includes performing first, second and third searches for the object within the current frame. The first search is performed with an original scale of the object, the second search is performed with an enlarged scale of the object, and the third search is performed with a shrunken scale of the object. The best match of the three searches can then be selected.

The histogram matching approaches can be either exhaustive searching or a gradient descent searching based on a given similarity measure. In order to cope with the changing scale of the target in time, searching in scale is also necessary. The target region is assumed to be a rectangle and its size is w×h at the previous frame, then histogram matching in the current frame is repeated using the window sizes of original, plus or minus θ percent of the original size. In the example shown in FIG. 2, θ=10, although other values could be used. For example, θ can be between 5 and 15.

Figure 4:
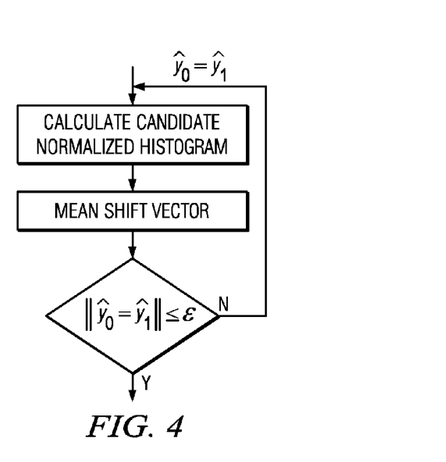
FIG. 4 shows an algorithm flowchart for mean shift iteration for location estimation according to another embodiment of the present invention.

FIG. 4 shows mean shift iteration for location estimation according to another embodiment of the present invention. In the mean shift iteration where the scale is fixed, only the object location estimation is updated. An algorithm flowchart is given in FIG. 4 and its details are described as follows.

1. Initialize the location of the candidate target in the current frame with $\hat{y}_0$, compute its normalized color histogram $p(y_0)$ at location $\hat{y}_0$ as $$p_u(\hat{y}_0)=C_p\Sigma_{i=1}^{n_h}(1-F(x_i))k(\|(\hat{y}_0-x_i)/h\|^2)\delta[b(x_i)-u], \quad (6)$$

with h as the bandwidth of the kernel profile, $\{x_i\}_{i=1\sim n_h}$ as the normalized pixel locations in the candidate target region, and the normalized constant $C_p$ expressed as $$C_p=1/(\Sigma_{i=1}^{n_h}k(\|(y-x_i)/h\|^2)\Sigma_{u=1}^m(1-F(x_i))\delta[b(x_i)-u]). \quad (7)$$

Afterwards the following expression can be evaluated:

$$\rho[q_t,p(\hat{y}_0)]=\Sigma_{u=1}^m\sqrt{q_{t,u}p_u(\hat{y}_0)}. \quad (8)$$

Formula (8) is called the Bhattacharyya coefficient.

2. Derive the weight according to $$w_i = \sum_{u=1}^{m} \sqrt{\frac{q_{t,u}}{p_u(\hat{y}_0)}} \delta[b(x_i) - u], \quad i = 1 \sim n_h. \quad (9)$$

3. Find the next location of the target candidate according to $$\hat{y}_1 = \frac{\sum_{i=1}^{n_h} x_i w_i (1 - F(x_i)) g\left(\left\|\frac{\hat{y}_0 - x_i}{h}\right\|^2\right)}{\sum_{i=1}^{n_h} w_i (1 - F(x_i)) g\left(\left\|\frac{\hat{y}_0 - x_i}{h}\right\|^2\right)}, \quad (10)$$

with $g(x) = -k'(x)$.

4. Compute the normalized color histogram $p(y_1)$ at location $\hat{y}_1$ and evaluate $$\rho[p(\hat{y}_1), q_t] = \sum_{u=1}^{m} \sqrt{p_u(\hat{y}_1) q_{t,u}}. \quad (11)$$

5. While $\rho[p(\hat{y}_1), q_t] < \rho[p(\hat{y}_0), q_t]$,
Do, $\hat{y}_1 = (\hat{y}_0 + \hat{y}_1)/2$,
Evaluate $\rho[p(\hat{y}_1), q_t]$
6. If $\|\hat{y}_0 - \hat{y}_1\| \leq \epsilon$ stop.
Otherwise set $\hat{y}_0 \leftarrow \hat{y}_1$ and go to step 2.

It is noted that to save computation cost, an alternative for the above modification is to replace $1-F(x)$ with $G(x)$. If $F(x)=0.0$, the proposed method turns back to be a traditional mean shift-based tracking method.

Figure 5:
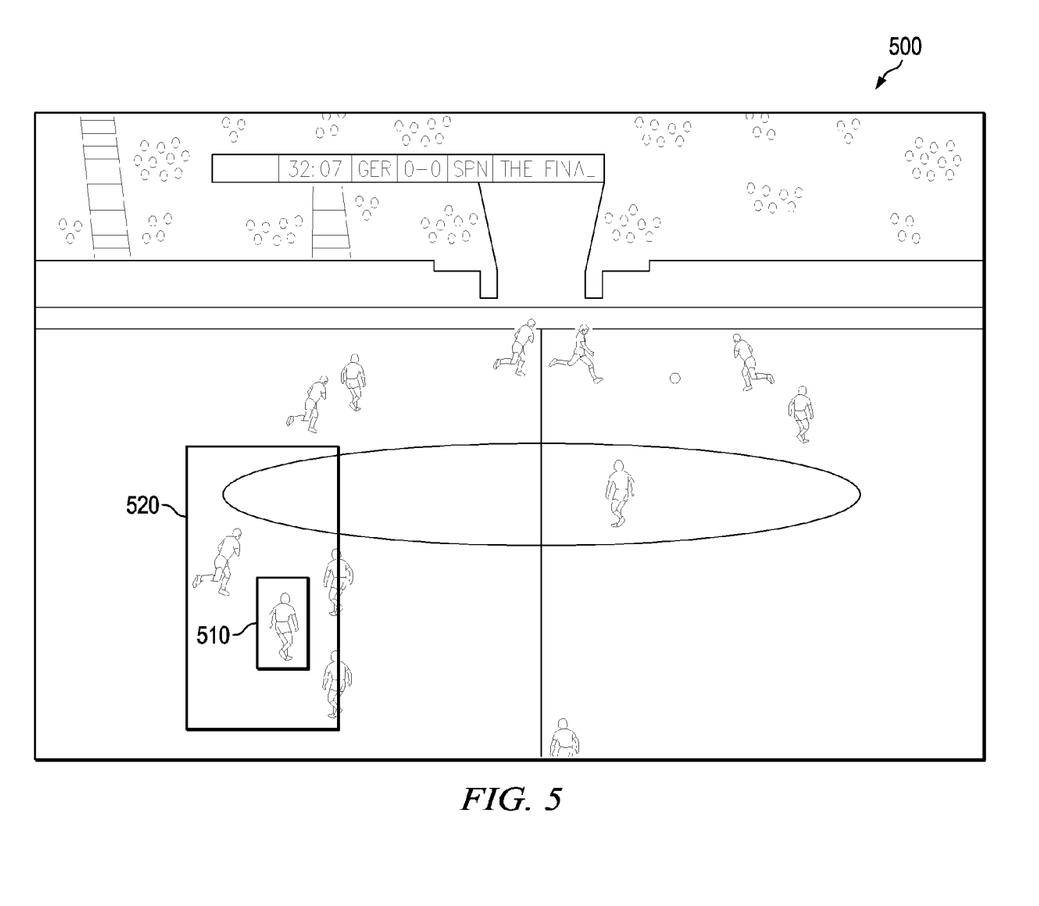
FIG. 5 shows a target and its background according to embodiments of the present invention.

The best scale is chosen by evaluating a measurement function that is a discriminant of the target from its background. FIG. 5 shows a video frame 500 of a soccer game. The target candidate region is the smaller rectangle 510 of size w×h, and the background region is the larger rectangle 520 of size 3 w×3 h except the inward rectangle 510 (the target candidate region). The normalized color histogram for the target candidate region at a given location y is re-denoted as $p_f(y)$ and the normalized color histogram for its background region is denoted as $p_b(y)$. The tracking task is to measure how similar between $p_f(y)$ and $q_t$ is based on a given similarity metric, such as the Bhattacharyya coefficient by $$\rho[q_t, p_f(y)] = \sum_{u=1}^{m} \sqrt{q_{t,u} p_{f,u}(y)}. \quad (12)$$

But this simple metric cannot stop the scale shrinking when used for scale adaptation. Here a proposed metric is defined below. FIG. 5 shows a target and its background according to embodiments of the present invention.

First, a minimal non-zero value in elements of the background histogram $p_b(y)$ is denoted as $\theta$, a weight function is calculated as $$v_u = \begin{cases} 0, & \text{if } p_{b,u}(y) = 0 \\ \frac{\theta}{p_{b,u}(y)}, & \text{otherwise.} \end{cases} \quad (13)$$

This weight function is employed to define a transformation for the representations of the target model and candidates. It diminishes the importance of those features which are prominent in the background.

Then, we calculate the weighted target model $q'_t$ as $$q'_{t,u} = C_q v_u \sum_{i=1}^{n_k} k(\|x_i^*\|^2) \delta[b(x_i^*) - u], \quad (14)$$

where the normalization constant $C_q$ is expressed as $$C_q = 1/(\sum_{i=1}^{n_k} k(\|x_i^*\|^2) \sum_{u=1}^{m} v_u \delta[b(x_i^*) - u]). \quad (15)$$

Correspondingly, the weighted target candidate model $p'_f(y)$ is given by $$p'_{f,u}(y) = C_f v_u \sum_{i=1}^{n_h} k(\|(y-x_i)/h\|^2) \delta[b(x_i) - u], \quad (16)$$

with h as the bandwidth of the kernel profile and the normalized constant $C_f$ expressed as $$C_f = 1/(\sum_{i=1}^{n_h} k(\|(y-x_i)/h\|^2) \sum_{u=1}^{m} v_u \delta[b(x_i) - u]). \quad (17)$$

Consequently, the best scale is obtained by maximizing the defined similarity function as follows $$\max \rho[q'_t, p'_f(y)] = \sum_{u=1}^{m} \sqrt{q'_{t,u} p'_{f,u}(y)}. \quad (18)$$

A benefit for this measure in scale adaption lies in that it weights the target histogram with the background and thus the discrimination of the target from its background is enhanced.

Eventually, an alpha-blending is used to smooth the adapted scale: if the previous scale is $h_{prev}$ and the adapted scale based on the defined metric (7) is $h_{opt}$, then the new scale $h_{new}$ is given as $$h_{new} = \alpha h_{opt} + (1-\alpha) h_{prev}, \quad (19)$$

with the blending factor as $0 < \alpha < 0.5$.

Referring back to FIG. 1, the fourth step is the Histogram Update. When the mean shift iteration is completed, the similarity value is checked. If it is big enough (no occlusion or camouflage), a model updating process can be run as follows.

First, the final estimated location $\hat{y}_0^*$ is recorded. Then, $\hat{y}_0$ and $q_t$ are replaced with $\hat{y}_0^*$ and $q_0$ (the initial histogram), respectively, and the mean shift iteration is run again. The location estimated in the second iteration is denoted as $\hat{y}_1^*$. The histogram update strategy is defined as: If $\|\hat{y}_0^* - \hat{y}_1^*\| \leq \epsilon$ (as a small threshold that enforces the second gradient descent iteration does not diverge too far from the result of the first iteration), the normalized color histogram $p(\hat{y}_1^*)$ is calculated at location $\hat{y}_1^*$ as the updated target model $q_{t+1}$, i.e., $q_{t+1} = p(\hat{y}_1^*)$. Otherwise, acting conservatively, the target model is not updated, i.e. $q_{t+1} = q_t$.

Eventually, the similarity measure is checked again. If it is very low, the object is lost in tracking; otherwise, the recursion is kept to the next frame.

Figure 6:
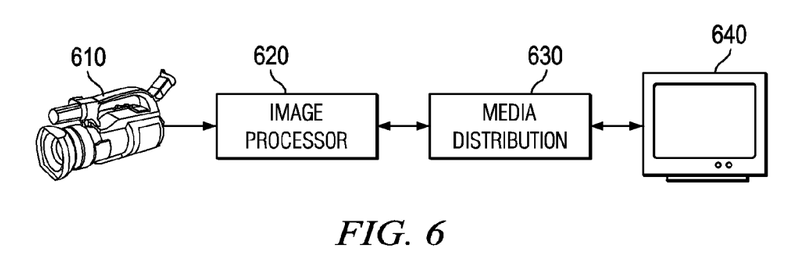
FIG. 6 shows an example of a system according to embodiments of the present invention.

FIG. 6 illustrates a system based on aspects of the present invention. A video generation device 610 generates the video frames. In the figure, this device 610 is illustrated as a camera. The camera can generate video using known techniques. This video can then be modified and/or enhanced using known techniques or can be processed as taken. In an alternate embodiment, the video is computer generated or otherwise derived without use of a camera.

The video is provided at an input of image processor 620. The image processor 620 is typically a computer system that includes a processor, e.g., a microprocessor or digital signal processor, programmed to perform the imaging processing steps, e.g., those algorithms and methods disclosed herein. The image processor 620 generally includes a memory for storing program code to cause execution of the processing and further memory for storing the image data during processing. The memory can be a single unit for all functions or multiple memories.

The processed video image, which may now include metadata relating to the location of the object or objects being tracked, can be used for a number of purposes. FIG. 6 illustrates a media distribution system 630. In this case, the video is provided to a viewer 640 via the media distribution system 630. For example, in an interactive television system, enhanced video is provided to the user 640 at his television, computer, smart phone or any other viewing display. Since the system can be interactive, FIG. 6 illustrates that communications from the user 640 back to the image processor are also possible.

Figure 7:
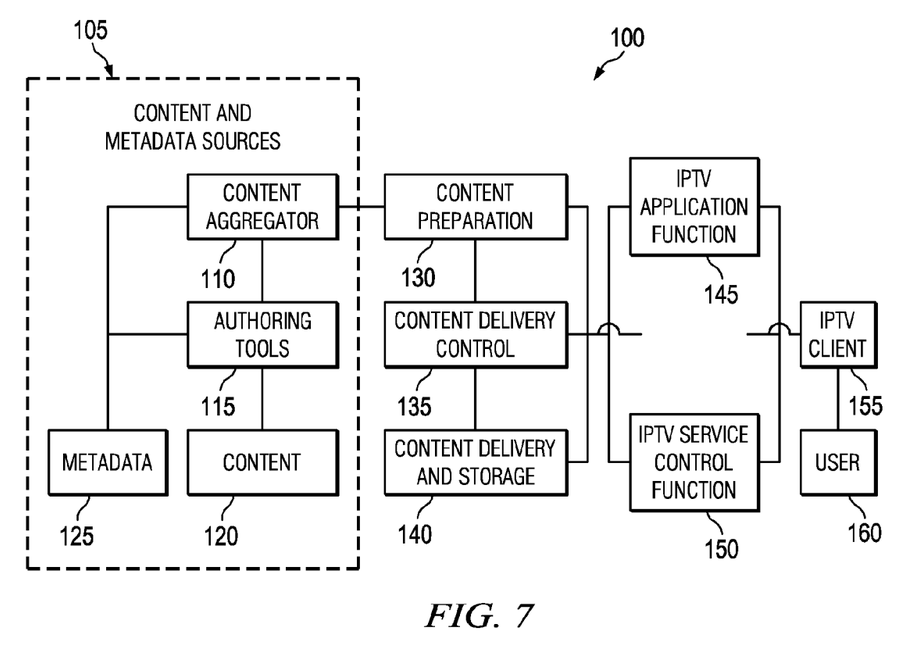
FIG. 7 illustrates a block diagram of a team classification-based interactive system, according to embodiments of the present invention.

FIG. 7 discloses an IPTV interaction system 100, in accordance with aspects of the present invention. The system can be for viewing a number of sports, such as soccer, football, basketball, baseball, hockey, cricket and others. It is noted that the specific configuration of FIG. 7 is only one of the many possible configurations.

In the embodiment, the user is registered with the IMS infrastructure. The TV content is to be enhanced with metadata information for the playfield description. The IPTV client is enhanced with such a service, which implies an environment to run additional services and respectively execute advanced program code on the IPTV client for on-line player localization (segmentation or tracking).

FIG. 7 further illustrates a sample system architecture. Under this architecture, a basic action flow may include the user 160, who registers to request an interactive service and makes use of the service. The user 160 is able to identify an object such as a player/referee or the ball to localize the object of interests (segmentation/tracking) The IMS-based IPTV Client 155 (such as Set-Top-Box or PDA) is responsible for providing the user 160 with the necessary functionality to make use of the interaction, e.g., real time player/referee localization and viewing the additional content.

The IPTV Service Control Function 150 manages all user-to-content and content-to-user relationships and controls the Content Delivery and Storage 140 and the Content Aggregator 110. The IPTV Application Function 145 supports various service functions and provides an interface to the user 160 to notice the IPTV service information and accept the service request of the user (such as registration or authentication). The IPTV Application Function 145, in conjunction with the Service Control Function 150 provides users with the value added services they request.

The Content Preparation 130 sends a content distribution request to the Content Delivery Control 135. The Content Delivery Control 135 produces a distribution task between Content Preparation 130 and the Content Delivery and Storage 140 according to the defined distribution policy when it receives the request of content distribution. The Content Delivery and Storage 140 delivers aggregated and metadata-enhanced content to the user 160, and may perform player localization in implementations where these tasks are not performed at the IPTV Client 155. The system may further perform team/player classification functions as described in co-pending application Ser. No. 12/686,902 (HW 09FW010).

The Content Aggregator 110 links the content 120 to the metadata 125 via the Authoring Tool 115 and aggregates content that is enhanced with metadata information for interactive service purposes. The Authoring Tool 115 runs play field learning and generates the MPEG-7 metadata.

A specific example of an interactive television system will now be described with respect to FIG. 8. This example provides only one of the many ways that the concepts described herein could be implemented.

This scenario describes a rich media interactive television application. It focuses on new concepts for interaction with moving objects in the sport programs. Based on direct interaction with certain objects, the viewer can retrieve rich media content about objects of his choice.

The interaction is based on the combination of information prepared on the IPTV server side and real time object localization (detection/tracking) on the IPTV client side. The information on the server side is stored as metadata in the MPEG-7 format and describes the playfield. The client side does the real time object processing and presents the related media information on a screen for user interaction.

The TV content is enhanced with metadata information. For example, a description of the field is represented by a color histogram. The user has to be registered with the IMS infrastructure. The IPTV client has to be enhanced with such a service, which implies an environment to run additional services and respectively execute advanced program code on the IPTV client for content processing and object highlighting. Charging can be used for transaction and accounting.

Figure 8:
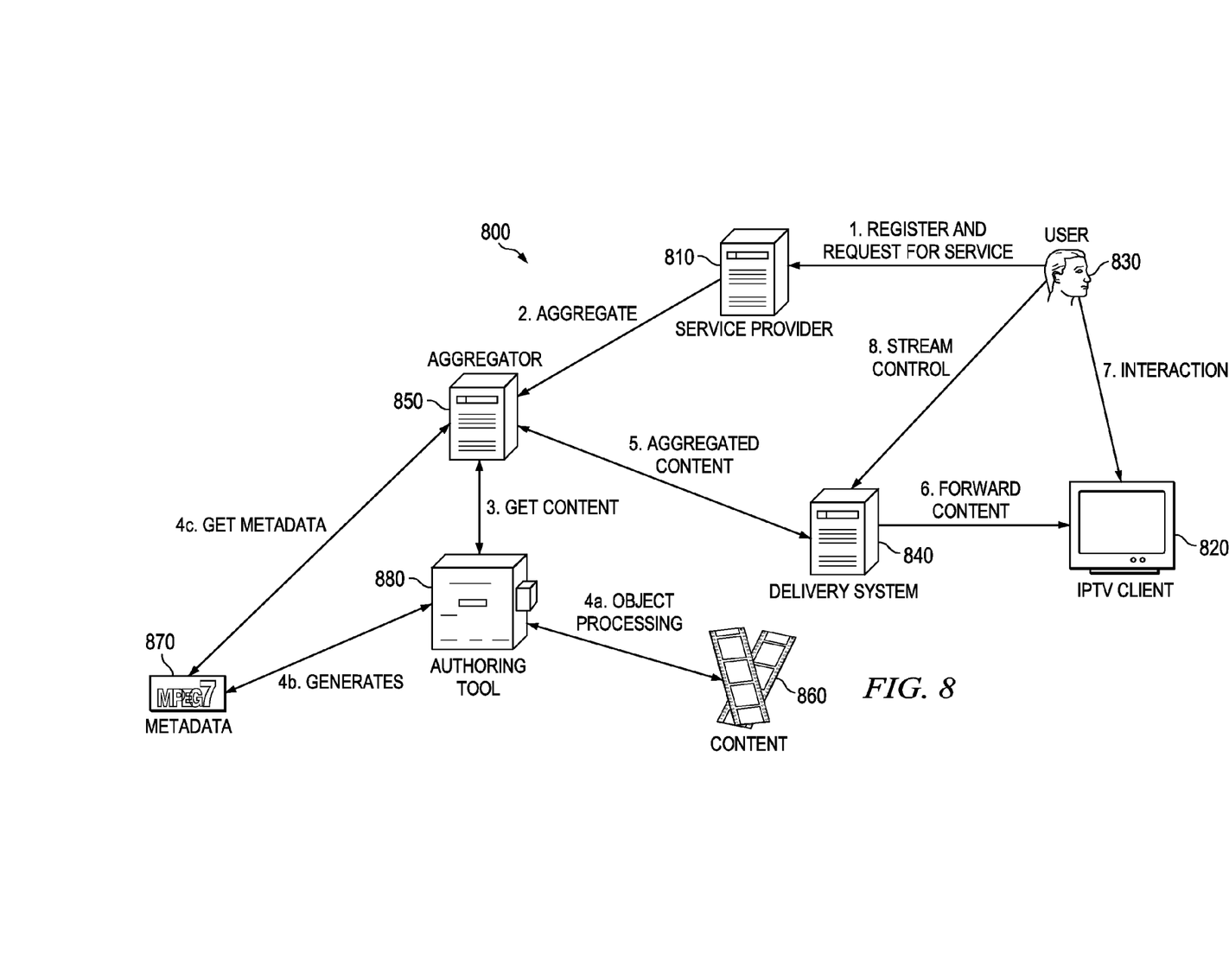
FIG. 8 illustrates a block diagram of an interactive television system, according to embodiments of the present invention.

FIG. 8 illustrates a block diagram showing a specific configuration of one interactive television system 800. As can be seen, this system implements many of the concepts discussed above with respect to FIG. 7.

Referring now to FIG. 8, the service provider 810 offers an interactive channel and metadata information. The service provider 810 hosts the needed network entities and provides the necessary infrastructure. An IMS charging system provides the service provider 810 with functionality for accounting. This feature allows the service provider 810 to fund the offered service.

The IPTV client 820, for example a set top box (STB), is responsible to provide the viewer 830 with the functionality to make use of the interaction, in terms of real time object processing, to spot high lighting of objects containing additional content, to select objects and to view additional content. The IMS based IPTV client 820 is enabled with techniques such as real time object processing for providing the interactive service. In another example, if the video content is not enhanced with the metadata information, the IPTV client 820 can provide a user interface to the user 830 for collecting such information.

The user 830 makes use of the service by selecting objects, and consuming additional content. The delivery system 840, typically owned by the service provider 810, delivers aggregated and metadata-enhanced content to the user 830, provides trick functions and highly efficient video and audio coding technologies.

The content aggregator 850 links the content 860 to the metadata 870 via the authoring tool 880. This aggregator 850 aggregates content, which is enhanced with metadata information for interactive service purposes. The content aggregator 850 provides the delivery system 840 with aggregated content and attaches them with enhanced content. Therefore, MPEG7 as standard for multimedia metadata descriptions should be considered. The authoring tool 880 disposes algorithms for field learning in video streams and an MPEG-7 metadata generator.

In the operation of the system 800, the user 830 registers with the service provider 810 and requests the desired service. For this example, the user 830 is able to click on a player to start tracking the player.

In response to the request from the user 830, the service provider 810 causes the aggregator 850 to prepare the enhanced content. In doing so, the aggregator 850 communicates with the authoring tool 880, which processes the content image and enhances the content 860 with the metadata 870. The aggregator 850 can then provide the aggregated content to the delivery system 840.

The delivery system 840 forwards the enhanced content to the IPTV client 820, which interacts with the user 830. The user 830 also provides stream control to the delivery system 840, either via the IPTV client 820 or otherwise.

Features of each of the functional units shown in FIG. 8 will be described in the following paragraphs.

Features of the service provider 810 include:
Interpret metadata provided by the content provider to inject interactive elements
Connect to IMS network (e.g., over the ISC interface)
Have awareness of the content
Provide service triggering based on a Public Service Identifier (PSI)
Accept and execute requests from user 830
Control the aggregator 850 in case of inband signaling
Control the delivery system 840 for forwarding the content from the aggregator 850 to the IPTV client 820
Features of the IPTV client 820 include
IMS enabled client (STB)
Audio and video rendering support
Basic codec support such as AC3 for audio and H.264/VC1 for video
RTP de-packetizing (based on RTP profiles) support for supported audio and video codecs (e.g., H.264)
Real time object processing for object detection and object tracking
Application logic (data engine) processing the segmentation and editing of MPEG-7 metadata information (MPEG7 Decoder)
Overlay-rendering support (display engine) for object highlighting as shown in the sample and interactive menu.
Display engine for additional content related to the selected object (picture in picture rendering, online shop, web portal, reuse of MHP, others)
Features of the user 830 include:
make use of the IMS enabled client 820
request the content
needs trick modes for stream control
select the video object via remote control
retrieve additional information
Features of the delivery system 840 include:
Provide content delivery to the IPTV client 820 via unicast or multicast channel
Transcode
Adapt content
Connect to the IMS core
Enable the IPTV client 820 to trigger media processing and content delivery
Support for trick functions; RTSP support
Inband (DVB-MPEG TS multiplex) and/or outband (linked content available on media ports) transport of metadata
Features of the aggregator 850 include:
Aggregate the highlight streams enhanced with metadata
Interface with Authoring Tool 880 (application server)
Prepare aggregated content for delivery
Features of the authoring tool 880 include:
Be linked to content
Run field learning algorithms to learn the field.
Run the object detection algorithm
Generate MPEG-7 metadata.

Although the present invention targets interactive services in IPTV systems, the invention is not so limited. The proposed scheme can be used in other video delivery systems with improved accuracy and low computational complexity.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An image processing method comprising:
receiving a video image at an image processor, the video image comprising an initial frame and a plurality subsequent frames;
locating an object within an initial frame of the video image;
generating a histogram related to the object in the initial frame;
generating a foreground map that includes the object;
for each subsequent frame in the video image:
performing a mean shift iteration to adjust the location of the object within the current frame;
updating the histogram related to the object; and
updating the foreground map, wherein performing the mean shift iteration and updating the histogram comprises inserting an information of the foreground map.

2. The method of claim 1, wherein performing the mean shift iteration comprises performing the mean shift iteration at a plurality of scales.

3. The method of claim 2, wherein updating the histogram related to the object comprises updating a scale.

4. The method of claim 2, wherein performing the mean shift iteration comprises:
performing a first search for the object within the current frame, the first search being performed with an original scale of the object;
performing a second search for the object within the current frame, the second search being performed with an enlarged scale of the object;
performing a third search for the object within the current frame, the third search being performed with a shrunken scale of the object; and
determining which search of the first, second and third searches found a best match of the object.

5. The method of claim 1, wherein performing the mean shift iteration comprises:
calculating a candidate normalized histogram;
processing the candidate normalized histogram with a mean shift vector; and
determining whether a result of the processing is less than a selected value.

6. The method of claim 1, wherein updating the histogram related to the object and updating the foreground map comprises:
determining that the object is lost;
relocating an object;
generating the histogram related to the object;
generating an updated foreground map that includes the object.

7. The method of claim 1, wherein locating the object comprises receiving information related to a location of where a user clicked on the video image.

8. The method of claim 1, wherein locating the object comprises executing an object location algorithm.

9. The method of claim 1, wherein locating the object comprises locating a player in a sports video.

10. An image processing method comprising:
receiving a video frame;
performing a first search for an object within the video frame by searching for a representation of the object within the video frame, the first search being performed with an original scale of the representation of the object, wherein performing the first search comprises determining a first similarity using a similarity metric;
performing a second search for the object within the video frame by searching for the representation of the object within the video frame, the second search being performed with an enlarged scale of the representation of the object, wherein performing the second search comprises determining a second similarity using the similarity metric;

performing a third search for the object within the video frame by searching for the representation of the object within the video frame, the third search being performed with a shrunken scale of the representation of the object, wherein performing the third search comprises determining a third similarity using the similarity metric, wherein the similarity metric computes a similarity between a normalized histogram of the representation of the object and a normalized histogram of a target model computed from a foreground map; and determining which search of the first, second and third searches found a best match of the object.

11. The method of claim 10, further comprising updating the representation of the object based on the determined best match.

12. The method of claim 11, wherein the representation comprises a size and a location.

13. The method of claim 10, wherein the representation of the object comprises a histogram.

14. The method of claim 10, wherein the enlarged scale is between about 5% and 15% larger than the original scale and the shrunken scale is between about 5% and 15% smaller than the original scale.

15. The method of claim 10, wherein, in each case, searching for the representation of the object comprises exhaustive searching.

16. The method of claim 10, wherein, in each case, searching for the representation of the object comprises a gradient descent searching based on a similarity measure.

17. An image processor comprising:
an input to receive a video image, the video image comprising an initial frame and a plurality of subsequent frames; and
a processing system to process the video image, the processing system including a processor programmed to perform the following steps:
locating an object within the initial frame of the video image;
generating a histogram related to the object in the initial frame;
generating a foreground map that includes the object;
for each subsequent frame in the video image:
performing a mean shift iteration to adjust the location of the object within the current frame;
updating the histogram related to the object; and
updating the foreground map, wherein performing the mean shift iteration and updating the histogram comprises inserting an information of the foreground map.

18. The image processor of claim 17, wherein performing the mean shift iteration comprises:
calculating a candidate normalized histogram;
processing the candidate normalized histogram with a mean shift vector; and
determining whether a result of the processing is less than a selected value.

19. The image processor of claim 17, wherein updating the histogram related to the object and updating the foreground map comprises:
determining that the object is lost;
relocating an object;
generating the histogram related to the object;
generating an updated foreground map that includes the object.

20. The image processor of claim 17, wherein performing the mean shift iteration comprises:

performing a first search for the object within the current frame, the first search being performed with an original scale of the object;
performing a second search for the object within the current frame, the second search being performed with an enlarged scale of the object;
performing a third search for the object within the current frame, the third search being performed with a shrunken scale of the object; and
determining which search of the first, second and third searches found a best match of the object.

21. The method of claim 1, wherein performing the mean shift iteration comprises adding a constraint based on a background information and a foreground information into the mean shift iteration.

22. The method of claim 1, wherein performing the mean shift iteration and updating the histogram comprises inserting an information of the foreground map into the computation of a mean shift vector and the histogram.

23. The method of claim 1, wherein updating the histogram comprises aligning a current model of the object with an initial model of the object.

24. The method of claim 2, wherein performing the mean shift iteration comprises:
identifying an optimal scale by using an information of a background region proximate the object.

25. The method of claim 24, wherein identifying an optimal scale comprises using a discriminant function.

26. The method of claim 25, wherein the discriminant function uses a weight function having an inverse dependence on a color histogram of the background region.

27. The method of claim 26, wherein the discriminant function is computed based on a similarity between a weighted target model computed from a foreground map and a weighted candidate model of the object.

28. The method of claim 27, wherein the weighted targeted model is weighted using the weight function, and wherein the weighted candidate model of the object is weighted using the weight function.

29. An image processing method comprising:
receiving a video image at an image processor, the video image comprising an initial frame and a plurality subsequent frames;
locating an object within an initial frame of the video image;
generating a histogram related to the object in the initial frame;
generating a foreground map that includes the object;
for each subsequent frame in the video image:
performing a mean shift iteration and a scale adaptation to adjust the location and scale of the object within the current frame, wherein the scale adaptation is performed by taking into account a discrimination of the object from a background region;
updating the histogram related to the object; and
updating the foreground map, wherein identifying an optimal scale comprises using a discriminant function.

30. The method of claim 29, wherein performing the scale adaptation comprises using a discriminant function that uses a weight function having an inverse dependence on a color histogram of the background region.

31. The method of claim 30, wherein the discriminant function is computed based on a similarity between a weighted target model computed from a foreground map and a weighted candidate model of the object.

32. The method of claim 31, wherein the weighted target model is weighted using the weight function, and wherein the weighted candidate model of the object is weighted using the weight function.

33. The method of claim 31, wherein the weight function $v_u$ comprises:

$$v_u = \begin{cases} 0, & \text{if } p_{b,u}(y) = 0 \\ \dfrac{\partial}{p_{b,u}(y)}, & \text{otherwise,} \end{cases}$$

wherein θ is a minimal non-zero value and $p_b(y)$ is the color histogram of the background region.

34. The method of claim 31, wherein the similarity is computed using a Bhattacharyya coefficient.

* * * * *